(12) United States Patent
Katsantones

(10) Patent No.: US 6,547,387 B1
(45) Date of Patent: Apr. 15, 2003

(54) EYEGLASS APPLIANCE FOR REDUCING EYE STRAIN

(76) Inventor: David A. Katsantones, 1015 Kuhn Rd. #3, Carol Stream, IL (US) 60188

( * ) Notice: Subject to any disclaimer, the term of this patent is extended or adjusted under 35 U.S.C. 154(b) by 0 days.

(21) Appl. No.: 10/076,461

(22) Filed: Feb. 15, 2002

(51) Int. Cl.[7] ................................................ G02C 9/00
(52) U.S. Cl. ............................................ 351/47; 351/57
(58) Field of Search ............................. 351/47, 57, 48, 351/58, 41, 44, 45, 46

(56) References Cited

U.S. PATENT DOCUMENTS

| | | |
|---|---|---|
| 4,542,964 A | 9/1985 | Gilson et al. |
| 5,076,665 A | 12/1991 | Petersen |
| 5,381,191 A | 1/1995 | Levy |
| D366,493 S | 1/1996 | Magdelaine et al. |
| 5,877,838 A * | 3/1999 | Chao .................. 351/47 |
| 6,003,990 A | 12/1999 | Einhorn |
| 6,062,691 A | 5/2000 | Markson |

* cited by examiner

*Primary Examiner*—Hung Xuan Dang

(57) ABSTRACT

An eye strain reducing lens structure for attaching to existing glasses to reduce eye strain when looking at a computer or television screen for extended periods of time. The eye strain reducing lens structure includes a pair of lenses coupled together by a bridge portion and a pair of attachment members each having resilient oppositional arms securable to a temple of an eyeglasses frame.

5 Claims, 2 Drawing Sheets

EYEGLASS APPLIANCE FOR REDUCING EYE STRAIN

BACKGROUND OF THE INVENTION

1. Field of the Invention

The present invention relates to eye strain reducing devices and more particularly pertains to a new eye strain reducing lens structure for attaching to existing glasses to reduce eye strain when looking at a computer or television screen for extended periods of time.

2. Description of the Prior Art

The use of eye strain reducing devices is known in the prior art. U.S. Pat. No. 5,381,191 describes a pair of glasses having a prism in each lens to refract light to avoid normal convergence of the user's eyes to reduce eye strain. Another type of eye strain reducing device is U.S. Pat. No. 6,003,990 having a press on lens adhesively affixed to the lens of an existing pair of glasses. U.S. Pat. No. 5,076,665 provides an adjustable lens frame with prism lenses. U.S. Pat. No. 6,062,691 provide multiple devices and exercises to improve eye muscle control to reduce strain. U.S. Pat. No. 4,542,964 provides a pair of glasses that have lenses designed to reduce eye strain. U.S. Pat. No. Des. 366,493 discloses an ornamental appearance for a pair of eyeglasses.

While these devices fulfill their respective, particular objectives and requirements, the need remains for a device that is attachable to an existing pair of glasses in a simple and removable manor.

SUMMARY OF THE INVENTION

The present invention meets the needs presented above by providing a simple structure that is connectable to an existing pair of glasses without adding significant weight or requiring adhesives.

Still yet another object of the present invention is to provide a new eye strain reducing lens structure that is easily removed from an existing pair of eyeglasses.

To this end, the present invention generally comprises a pair of lenses coupled together by a bridge portion and a pair of attachment members each having resilient oppositional arms securable to a temple of an eyeglasses frame.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

The objects of the invention, along with the various features of novelty which characterize the invention, are pointed out with particularity in the claims annexed to and forming a part of this disclosure.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
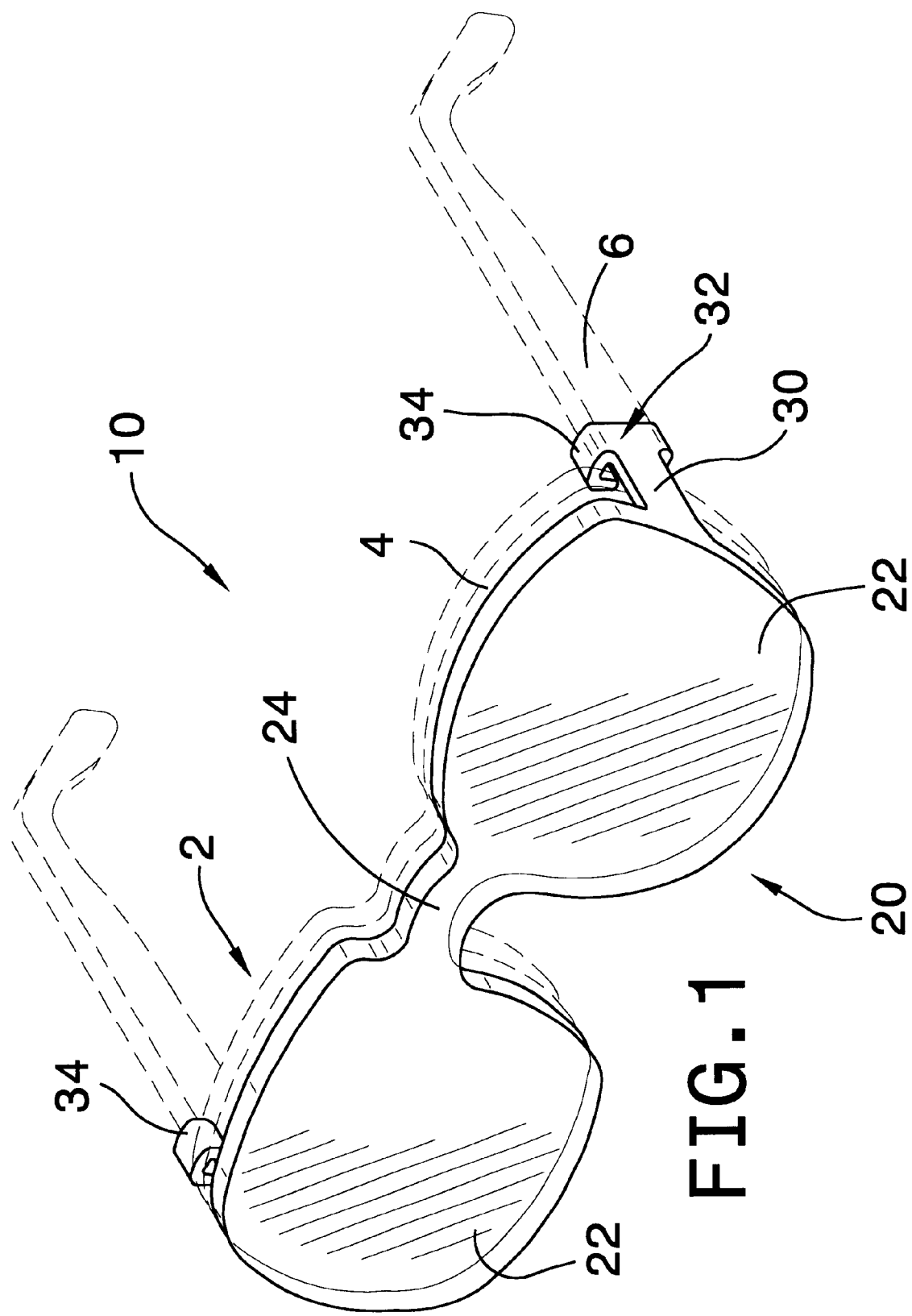
FIG. 1 is a perspective view of a new eye strain reducing lens structure according to the present invention.
Figure 2:
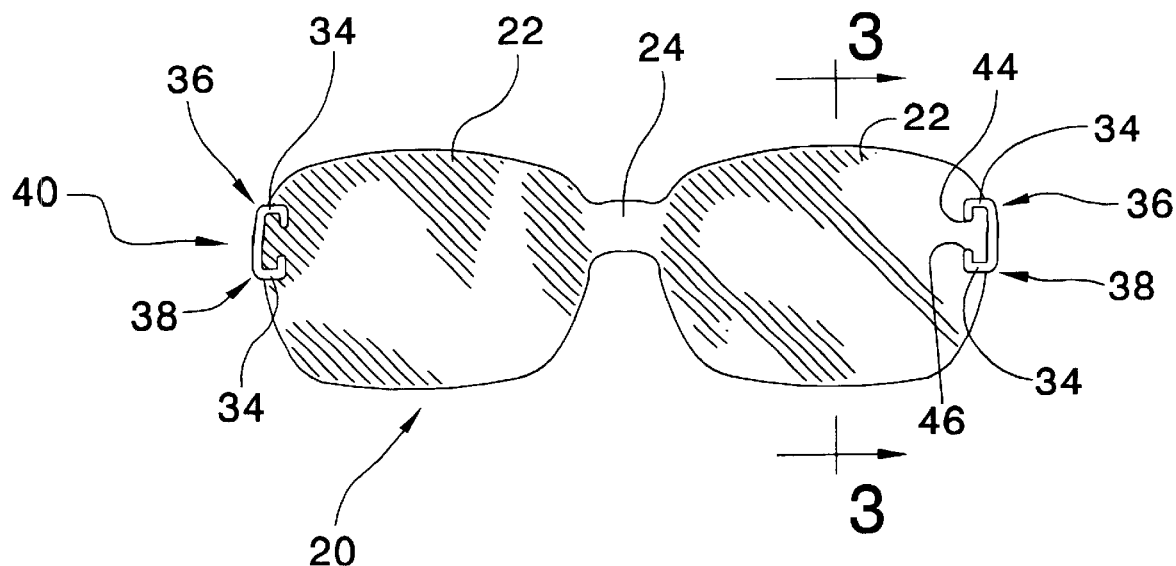
FIG. 2 is a rear view of the present invention.
Figure 3:
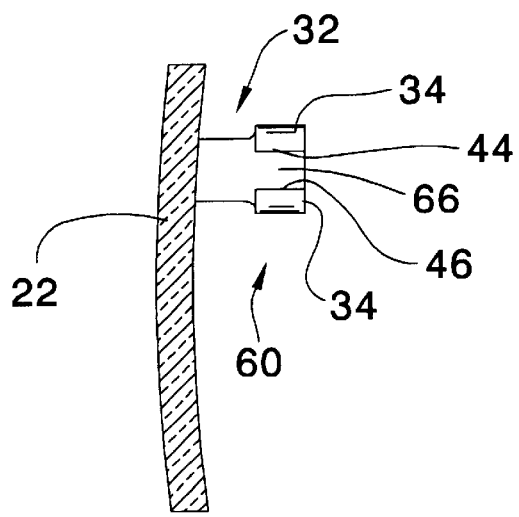
FIG. 3 is a cross-sectional view of the present invention taken along line 3—3 of FIG. 2.

With reference now to the drawings, and in particular to FIGS. 1 through 3 thereof, a new eye strain reducing lens structure embodying the principles and concepts of the present invention and generally designated by the reference numeral 10 will be described.

As best illustrated in FIGS. 1 through 3, the eye strain reducing lens structure 10 generally comprises a main member 20 including a pair of lenses 22 coupled to each other by a bridge section 24. Each of the lenses 22 is structured to reduce eye strain in a manner that is conventionally known in the art. Each lens 22 is positioned to sit adjacent to existing lens 4 when the main member 20 is coupled to an existing pair of eyeglasses 2.

A pair of attachment members 30 extend from the main member 20. Each of the attachment members 30 is structured to receive an associated temple 6 of an eyeglasses frame of the existing pair of eyeglasses 2.

Each attachment member includes an extension portion 32 and a pair of oppositional arm portions 34. The oppositional arm portions 34 are generally arcuate and curving towards each other to form a clip 40 for engaging the associated temple 6 of the eyeglasses frame of the existing pair of eyeglasses 2.

The arm portions 34 are positioned to extend from opposite sides 36 and 38 of a distal portion 66 of the extension portion 32.

Distal ends 44 and 46 of the oppositional arms 34 are positioned to extend towards each other. The distal ends 44 and 46 are positioned in spaced relationship to each other whereby the oppositional arms 34 are adapted for permitting the associated temple 6 to pass between the oppositional arms 34 to facilitate removal of the main member 20.

In an embodiment, the main member 20 and the attachment members 30 are integrally joined together. A cross section of a distal section 60 of each attachment member 30 taken transverse to a longitudinal axis of the attachment member 30 is generally C-shaped.

In use, the main member is attached to an existing pair of glasses when needed and easily removed when not needed.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. An eye strain reducing glasses attachment comprising:
   a main member having a pair of lenses coupled to each other by a bridge section, each of said lenses being structured to reduce eye strain and positioned to sit adjacent to existing lens when said main member is coupled to an existing pair of eyeglasses; and
   a pair of attachment members extending from said main member, each of said attachment members being structured to receive an associated temple of an eyeglasses frame of the existing pair of eyeglasses;

each attachment member having an extension portion and a pair of oppositional arm portions, said oppositional arm portions being generally arcuate and curving towards each other to form a clip for engaging the associated temple of the eyeglasses frame of the existing pair of eyeglasses; and distal ends of said oppositional arms being positioned to extend towards each other, said distal ends being positioned in spaced relationship to each other whereby said oppositional arms are adapted for permitting the associated temple to pass between said oppositional arms to facilitate removal of said main member.

2. The eye strain reducing glasses attachment of claim 1, further comprising:

said arm portions being positioned to extend from opposite sides of a distal portion of said extension portion.

3. The eye strain reducing glasses attachment of claim 2, further comprising:

a cross section of said distal portion of each attachment member taken transverse to a longitudinal axis of said attachment member being generally C-shaped.

4. The eye strain reducing glasses attachment of claim 1, further comprising:

said main member and said attachment members being integrally joined together.

5. An eye strain reducing glasses attachment comprising:

a main member having a pair of lenses coupled to each other by a bridge section, each of said lenses being structured to reduce eye strain and positioned to sit adjacent to existing lens when said main member is coupled to an existing pair of eyeglasses;

a pair of attachment members extending from said main member, each of said attachment members being structured to receive an associated temple of an eyeglasses frame of the existing pair of eyeglasses;

each attachment member having an extension portion and a pair of oppositional arm portions, said oppositional arm portions being generally arcuate and curving towards each other to form a clip for engaging the associated temple of the eyeglasses frame of the existing pair of eyeglasses;

said arm portions being positioned to extend from opposite sides of a distal portion of said extension portion;

distal ends of said oppositional arms being positioned to extend towards each other, said distal ends being positioned in spaced relationship to each other whereby said oppositional arms are adapted for permitting the associated temple to pass between said oppositional arms to facilitate removal of said main member;

said main member and said attachment members being integrally joined together; and a cross section of said distal portion of each attachment member taken transverse to a longitudinal axis of said attachment member being generally C-shaped.

* * * * *